Patented Aug. 8, 1950

2,518,366

UNITED STATES PATENT OFFICE 2,518,366

FLUX COMPOSITION FOR GAS WELDING OF HIGH NICKEL ALLOYS

George Raymond Pease, Plainfield, N. J., assignor to The International Nickel Company, Inc., New York, N. Y., a corporation of Delaware No Drawing. Application July 1, 1948, Serial No. 36,413

2 Claims. (Cl. 148—23)

The present invention relates to the art of welding and, more particularly, to a flux composition specially suited for oxy-acetylene welding of high nickel alloys.

It is well known that gas welding fluxes generally contain large amounts of boric acid and/or its salts, notably borax. This applies to fluxes in general use for the gas welding of high nickel alloys including alloys sold under the trade-marks "Monel" and "Inconel." The boron-rich fluxes are well suited for many gas welding applications because, in addition to other properties, they possess relatively low melting points and a sticky, viscous molten phase which enables the flux to resist displacement by spalling or otherwise from the surfaces being welded. However, it has been found that when high nickel alloys are melted in a slag containing boric acid or borates and a reducing agent, boron is introduced into the melt in the form of an embrittling boride phase. This deleterious effect of a boron-rich flux has been found to be particularly objectionable and the cause of unsatisfactory welds by reason of lower ductility in the welding of high nickel alloys. Although many attempts were made to overcome the foregoing difficulties by the employment of boron-free flux compositions, none, so far as I am aware, was entirely successful when carried into practice commercially or made on an industrial scale. Among the deficiencies or disadvantages encountered in the use of these boron-free prior art fluxes which rendered their use difficult and, in many cases, unsatisfactory, include inadequacy of weld metal protection and a marked tendency to the spalling of the unmolten flux from the metal surface when the flame is first applied.

It has now been discovered that the disadvantages of the prior art flux for welding high nickel alloys can be successfully overcome by the use of a mixture of the chlorides and fluorides of sodium, calcium and barium so compounded as to produce a slag with proper melting temperatures, fluidity and weld metal coverage and containing in addition a water-dispersible organic binder to prevent spalling during heating. The preferred binder employed is gum arabic but other water-dispersible gums may be substituted therefor.

It is an object of the present invention to provide an improved flux composition adapted particularly for the more successful gas welding of high nickel alloys.

Another object of the invention is to provide an improved flux composition adapted for gas welding of high nickel and other alloys which shall be boron-free so as to eliminate boron pick up by the weld metal and the deleterious effects thereof.

It is a further object of the invention to provide an improved flux composition composed of the chlorides and fluorides of sodium, calcium and barium in proportions to produce a slag with proper melting temperatures, fluidity and weld metal coverage.

The invention further contemplates the incorporation with a flux composed of the chlorides and fluorides of sodium, calcium and barium of a water-dispersible organic binder to prevent spalling during heating and which binder is preferably gum arabic.

Among the further objects of the present invention is the provision of a weld flux composition suitable for the gas welding of high nickel alloys and composed of sodium fluoride from 0 to about 15% by weight, calcium fluoride about 10% to about 40%, barium fluoride about 40% to about 70%, barium chloride about 10% to about 20% and gum arabic about 2% to about 10%.

Other objects and advantages of the present invention will become apparent from the following description taken in conjunction with the illustrative examples of flux compositions and data with reference to welds produced therewith.

Generally speaking, the present invention contemplates the provision of a boron-free flux composition particularly suited for oxy-acetylene welding of high nickel alloys comprising fluorides and chlorides of sodium, calcium and barium compounded in special proportions to produce a slag with proper melting temperatures, fluidity and weld metal coverage and containing in addition a water-dispersible organic binder of a character to prevent spalling during heating of the weld metal and which binder is preferably gum arabic. Test welds with the aforesaid composition have proven to be stronger and more ductile and less susceptible to hot cracking than welds made with many prior art flux compositions under tests in the welding of high nickel alloys. The flux compositions embodying the invention are preferably composed of substantially the following composition:

|  | Percentages by Weight | |
|---|---|---|
|  | Range | Preferred |
|  | Per cent | Per cent |
| Sodium fluoride | 0-15 | 4 |
| Calcium fluoride | 10-40 | 16 |
| Barium fluoride | 40-70 | 60 |
| Barium chloride | 10-20 | 15 |
| Gum arabic | 2-10 | 5 |

The flux composition is mixed with water to form a paste suitable for brushing and applied to the surfaces of the joint to be welded.

For the purpose of giving those skilled in the art a better understanding of the invention, the following illustrative example is given:

EXAMPLE

Tests employing a flux substantially of the preferred composition and comprising sodium fluoride about 5 parts by weight, calcium fluoride about 20 parts, barium fluoride about 75 parts, barium chloride about 20 parts, and a binder of gum arabic about 6 parts were made in the welding of ⅜ inch plate of nickel-copper alloy (sold under the trade-mark "Monel"). The novel flux was applied to the edges of the weld plates and to the welding rod and the welding was performed with a slightly reducing flame. In these welding operations, the new flux was demonstrated to have good melting characteristics and very good bead and metal protection. The physical properties of the test welds are given in the following tables:

*Table 1.—Physical properties of welds of ⅜" plate using the preferred flux*

TENSILE STRENGTH

| Specimen No. | Weld Appearance | Min. Cross Sect., Sq. In. | Max. Load, Lbs. | T. S., Lbs./Sq. In. |
|---|---|---|---|---|
| 1 | Bright bead under continuous slag. Ripples uniform. | 0.381 | 25,870 | 67,900 |
| 2 | Same | 0.377 | 26,020 | 69,000 |

GUIDED BEND TEST

|  | Face or Root in Tension | Elongation Per Cent |
|---|---|---|
| 3 | Face | 21.5 |
| 4 | Root | 25 |
| 5 | do | 21.7 |

Examples of modified flux compositions made in accordance with the invention and advantageous properties of the welds and welding characteristics are indicated in the following Tables 2 and 3.

*Table 2*

| Flux No. | Flux Composition[1] | | | | Binder,[1] Gum Arabic |
|---|---|---|---|---|---|
|  | NaF | CaF₂ | BaF₂ | BaCl₂ |  |
| 1 | 5 | 20 | 75 | 10 | 5 |
| 2 | 5 | 20 | 75 | 20 | 6 |
| 3 | 5 | 20 | 75 | 20 | Shellac 5 |

[1] Parts by weight.

*Table 3*

| Flux No. | Melt. Point | Fluidity of Metal | Wetting Action | Bead Appearance | Metal Protection | Spalling Tendency |
|---|---|---|---|---|---|---|
| 1 | O. K.[1] | Good | Good | V. Good | V. Good | None. |
| 2 | O. K. | do | do | do | do | Do. |
| 3 | O. K. | do | do | do | do | Do. |

V.=very.
[1]=melting point satisfactory.

It is to be observed that the present invention provides a novel flux or welding composition which is substantially free of substances capable of producing deleterious hot cracking when employed in the oxy-acetylene welding of high nickel alloys. The improved flux has been found to compare favorably with the many commercial fluxes in use in most of its important properties and has proven definitely superior with relation to weld metal protection in the gas welding operation with the important added advantage, incident to the absence of boron, of eliminating the embrittlement of the fusion metal by this element. Gum arabic and other water-dispersible gums have the specific chemical advantage of being non-reactive with barium chloride, thus avoiding destruction of the bonding values and wetting action of the flux. The employment of the water-dispersible organic binder operates effectively to prevent spalling during heating and is particularly desirable and important in the flux composition having a high melting point chloride salt which is essential for optimum weld metal protection. The binder employed, as will be understood, may be incorporated in a small but effective percentage up to about 10%.

While gum arabic is referred to as a preferred binder, it will be obvious that other water-insoluble organic materials such as shellac may be substituted therefor. The sodium soaps of rosin acid and certain fatty acids may similarly be employed as effective binders, provided that the water soluble barium chloride component of the flux is rendered insoluble by fusion with the water-insoluble salts prior to the admixture of the soap to the flux composition.

The welding flux composition of the present invention as described is substantially free of substances capable of producing deleterious hot cracking in the oxy-acetylene welding of high nickel alloys wherein the term "high nickel alloys" refers to nickel-base alloys and includes such alloys as the nickel-base alloys sold under the trademarks "Monel" and "Inconel" normally comprising approximately 67% Ni, 30% Cu, 1.4% Fe, 1% Mn, 0.1% Si, 0.15% C, 0.01% S, and 78.5% Ni, 0.2% Cu, 6.5% Fe, 0.25% Mn, 0.25% Si, 0.08% C, 0.015% S respectively. The weld rod employed in effecting the weld may, in accordance with usual practice, be of approximately the same composition as the members to be welded.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A welding composition substantially free of substances capable of producing deleterious hot cracking in the oxy-acetylene welding of high nickel alloys consisting of, by weight, up to about 15% sodium fluoride, calcium fluoride from about 10% to about 40%, barium fluoride from about 40% to about 70%, barium chloride from about 10% to about 20%, and a water-dispersible organic binder of gum arabic from about 2% to about 10%.

2. A welding flux substantially free of boron compounds and adapted for the oxy-acetylene welding of high nickel alloys containing the following composition by weight: sodium fluoride 4%, calcium fluoride 16%, barium fluoride 60%, barium chloride 15%, and a water-dispersible organic binder consisting of gum arabic 5%.

GEORGE RAYMOND PEASE.

REFERENCES CITED

The following references are of record in the file of this patent:

UNITED STATES PATENTS

| Number | Name | Date |
|---|---|---|
| 1,882,601 | Hollup | Oct. 11, 1932 |
| 2,053,956 | Humberstone et al. | Sept. 8, 1936 |
| 2,303,746 | Kihlgren et al. | Dec. 1, 1942 |

OTHER REFERENCES

Welding Encyclopedia, twelfth edition, (1947) pages 436 and 437, published by McGraw-Hill, New York.